United States Patent [19]

Cawrse et al.

[11] 3,876,098

[45] Apr. 8, 1975

[54] APPARATUS FOR COLLECTING AND UNLOADING HAY BALES AND THE LIKE

[76] Inventors: Frank Cawrse; George F. Cawrse, both of Rt. 3, Box 325, Lebanon, Oreg. 97355

[22] Filed: Jan. 2, 1974

[21] Appl. No.: 429,596

[52] U.S. Cl............................. 214/522; 214/83.26
[51] Int. Cl............................................. B60p 1/00
[58] Field of Search .......... 214/518, 519, 520, 521, 214/522, 16.1 B, 83.26

[56] References Cited
UNITED STATES PATENTS

| | | | |
|---|---|---|---|
| 2,738,885 | 3/1956 | Demaline | 214/16.1 B |
| 2,867,340 | 1/1959 | Brownlee et al. | 214/521 |
| 3,412,884 | 11/1968 | Fischer | 214/518 |
| 3,675,802 | 7/1972 | Best et al. | 214/520 |

*Primary Examiner*—Albert J. Makay
*Assistant Examiner*—Lawrence J. Oresky
*Attorney, Agent, or Firm*—Oliver D. Olson

[57] ABSTRACT

A wheeled vehicle mounts a rotary framework providing a plurality of longitudinally extending, peripheral and inner compartments for the removable storage of a multiplicity of hay bales or like objects. A longitudinally extending, reversibly movable feed conveyor below the framework registers with each of the peripheral compartments selectively for feeding bales to and from the compartments. Arcuate shields extend from the opposite sides of the feed conveyor upwardly to form with the latter a semi-circular shield surrounding the loower half of the framework to confine the bales in the lower peripheral compartments. A forwardly extending, reversibly removable delivery conveyor is aligned with the feed conveyor and is adjustable pivotally to lower its forward end for picking up bales from the ground and delivering them to the feed conveyor, and to raise its forward end for delivering bales from the feed conveyor to a storage conveyor for moving the bales to storage.

9 Claims, 18 Drawing Figures

APPARATUS FOR COLLECTING AND UNLOADING HAY BALES AND THE LIKE

BACKGROUND OF THE INVENTION

This invention relates to the handling of bales of hay and like objects, and more particularly to apparatus for collecting such objects from the ground for transfer to storage.

In the harvesting of hay, it is the general practice to bale it in the field and then to pick up the bales by hand or by forklift mechanisms and deposit them on the bed on a wagon or truck for transport to storage. This procedure is time consuming, laborious work requiring a considerable number of people.

A variety of types of mechanical collectors and unloaders provided heretofore are characterized as being of complex and costly construction, requiring attendants for manipulating the bales, being capable of handling only specific shapes and sizes of bales, and having a bale storage capacity which is quite limited with respect to the size of the apparatus.

SUMMARY OF THE INVENTION

In its basic concept, the apparatus of this invention associates with an elongated feed conveyor a rotary framework providing a plurality of longitudinally extending peripheral and inner compartments for the removable storage of a multiplicity of hay bales and like objects, the inner compartments and associated peripheral compartments being removably closed from each other by retractable gates.

It is by virtue of the foregoing basic concepts that the principal objective of this invention is achieved; namely, to overcome the aforementioned disadvantages and limitations of prior collecting and unloading procedures and equipment.

Another important object of this invention is the provision of apparatus of the class described having a maximum collection capacity in relation to its size and weight.

Still another important object of this invention is the provision of apparatus of the class described by which the loading and unloading may be accomplished by a single operator.

A further important object of this invention is the provision of apparatus of the class described which includes a novel delivery conveyor associated with the feed conveyor and adjustable between ground-engaging pick-up condition and an elevated outfeed position.

A still further important object of this invention is the provision of apparatus of the class described which is of relatively simplified construction for economical manufacture.

The foregoing and other objects and advantages of this invention will appear from the following detailed description taken in connection with the accompanying drawings of a preferred embodiments.

DESCRIPTION OF THE PREFERRED EMBODIMENT

Figure 1:
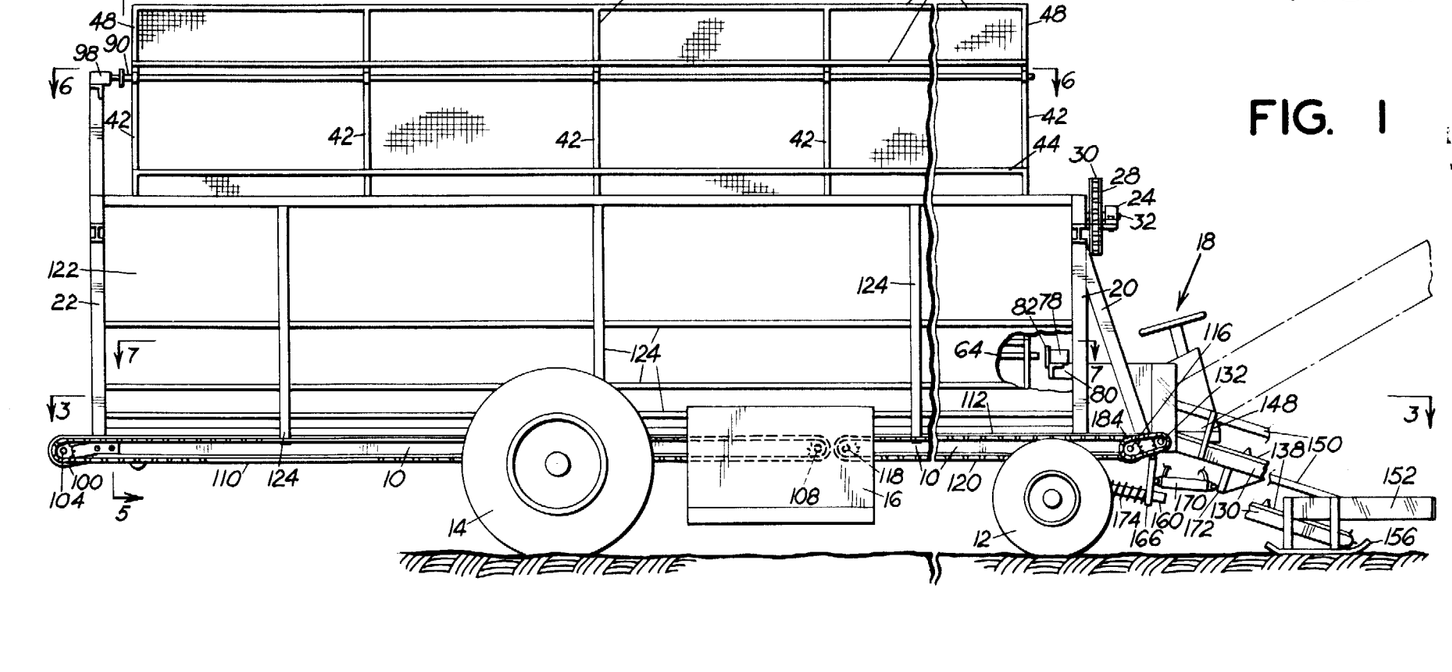
FIG. 1 is a foreshortened view in side elevation of a hay bale collector and unloader embodying the features of this invention.

Referring primarily to FIG. 1 of the drawings, the apparatus of this invention is shown mounted on the frame 10 of the vehicle supported for mobility on front and rear wheels 12 and 14, respectively. Although the wheeled vehicle may be of the unpropelled wagon or trailer type adapted to be pulled by a tractor or other suitable power vehicle, the preferred type of vehicle illustrated is of the self-propelled type. Thus, it includes an engine 16 supported by the frame and controlled from an operator's station 18 at the front end of the frame. The front wheels are steerable, as will be understood.

Front and rear frame members 20 and 22, respectively, extend upwardly from the vehicle frame and support at their upper ends front and rear bearings 24 which support for rotation therein adjacent ends of elongated shaft 26. Power means is provided for rotating the shaft. In the embodiment illustrated, a sprocket 28 is mounted on the front end of the shaft for rotation therewith and is connected through a chain 20 (FIG. 2) to a reduction sprocket secured for rotation with a shaft 32 journaled in bearings supported by the horizontal front frame member 20. A larger sprocket 34 on this shaft is connected through a chain 36 to a sprocket on the output shaft of a gear reduction unit 38. The input shaft of the gear reduction unit is connected to the output shaft of a drive motor 40. Although the drive motor may be of the electric type, it preferably is of the hydraulic type supplied with hydraulic fluid under pressure. The latter may be provided conveniently by a hydraulic pump (not shown) driven by the vehicle engine 16.

The elongated shaft 26 supports for rotation therewith a framework constructed to provide a plurality of elongated peripheral and inner compartments for the removable storage of a multiplicity of hay bales B or like objects. In the embodiment illustrated, the framework is constructed of a plurality of longitudinally spaced pipes 42 secured at their inner ends to the shaft and extending substantially radially outward therefrom. These pipes are interconnected by longitudinal reinforcing braces 44 and transverse reinforcing braces 46. The framework also includes a plurality of pairs of laterally spaced, parallel, outwardly extending pipes 48 between adjacent radial pipes 42. The radial pipes are connected to the adjacent ones of the parallel pipes intermediate their ends by transverse reinforcing braces 50. Longitudinal reinforcing braces 44 also interconnect the longitudinally spaced pipes 48.

The transverse braces 50 and the portions of the radial and parallel pipes projecting outward therefrom support wire screening 52 (FIG. 5) or other sheet material which extends throughout the length of the framework to form longitudinal, elongated compartments 54 spaced apart circumferentially about the periphery of the framework.

Figure 2:
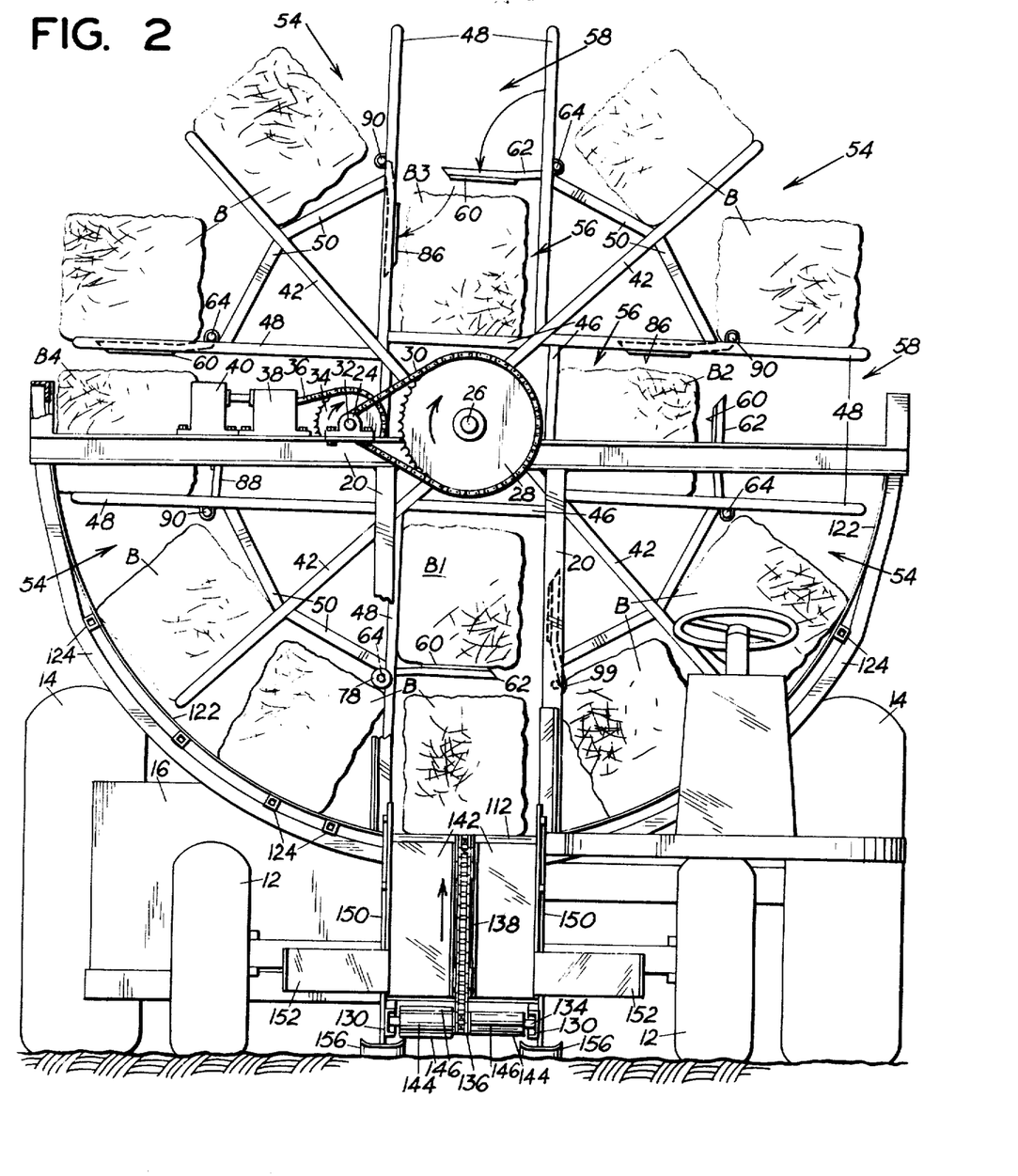
FIG. 2 is a front elevation as viewed from the right in FIG. 1.

The space between each pair of parallel pipes 48 is arranged to provide an inner compartment 56 and an outer compartment 58 (FIG. 2). This is achieved by the provision of a gate 60 which extends the full length of the framework and is mounted for movement between an extended position operatively closing the inner compartment from the associated outer compartment and a retracted position opening said inner compartment to the outer compartment. In the embodiment illustrated, each of the gates is formed of an elongated metal strip. A plurality of longitudinally spaced arms 62 are secured to the plate and extend laterally therefrom for attachment to a longitudinal pivot shaft 64. The pivot shaft is journaled for rotation in bearings 66 secured to the pipies 48 on the side of the dual space leading in the direction of rotation of the framework. This gate is pivotable through approximately 90° in the outer compartment 58 between a retracted position adjacent the pipes and an extended position extending across the space between the inner and outer compartments. A stop lug 68 (FIGS. 5-9) on each of the pipes engages the adjacent arm 62 to prevent further rotation of the gate into the inner compartment.

Figures 5, 8, 9:
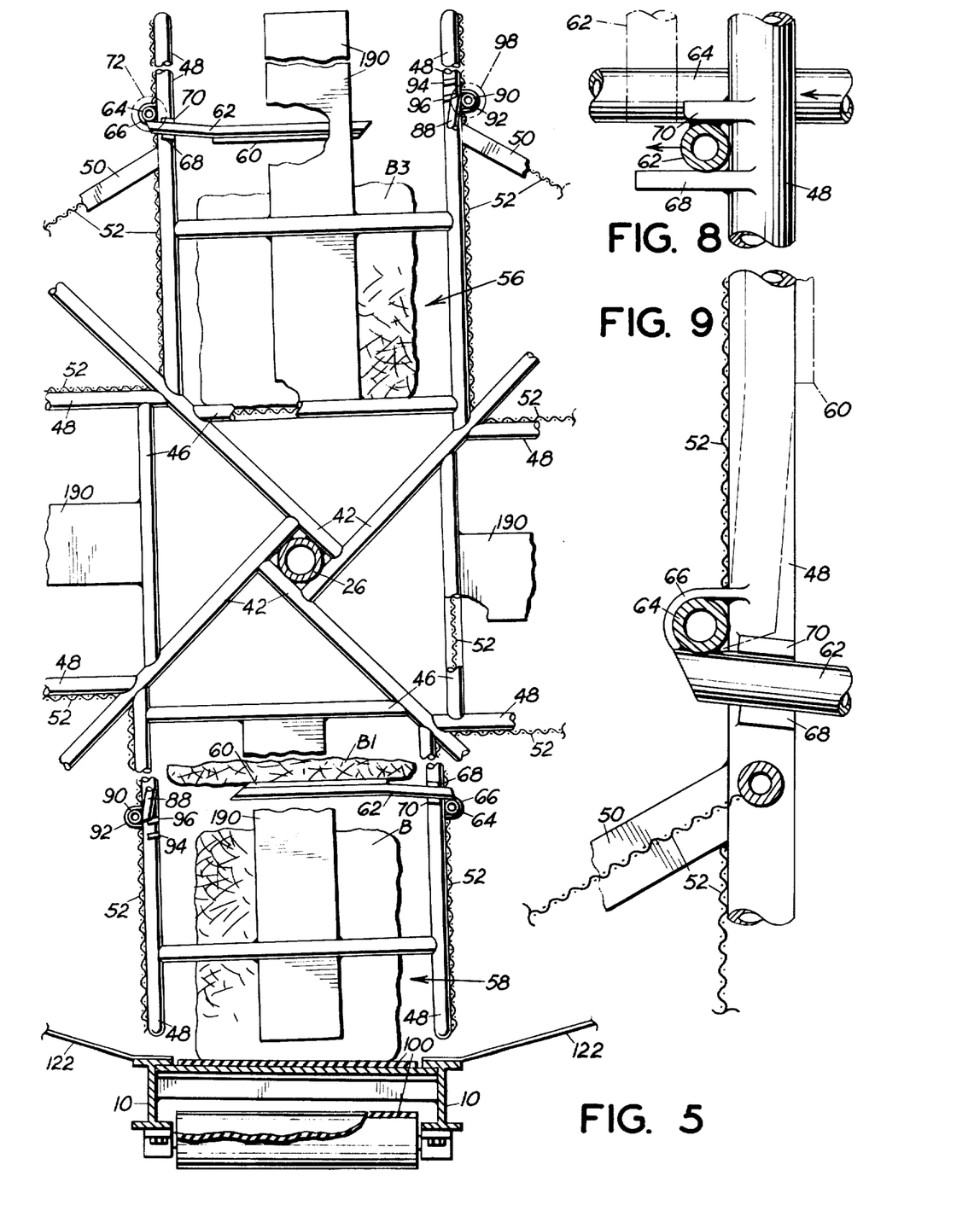
FIG. 5 is a foreshortened view in transverse section taken on the line 5—5 in FIG. 1.
FIG. 8 is a fragmentary view in longitudinal section taken on the line 8—8 in FIG. 6.
FIG. 9 is a fragmentary view in transverse section taken on the line 9—9 in FIG. 6.
Figure 6:
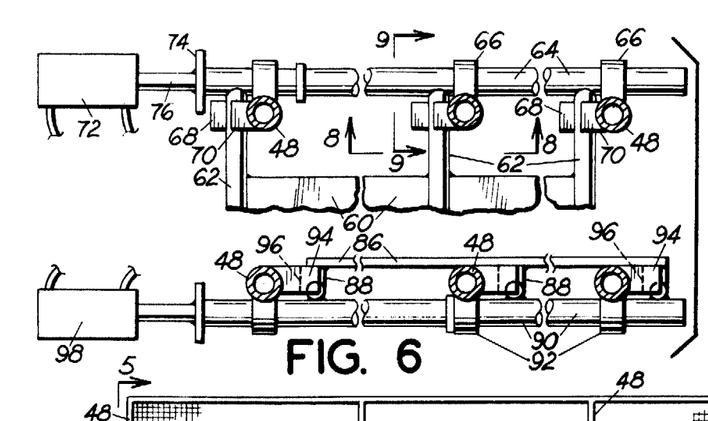
FIG. 6 is a foreshortened view in longitudinal section taken on the line 6—6 in FIG. 1.

The shaft 64 also is movable longitudinally through the support bearings 66 between locked and unlocked positions. For this purpose, a locking lug 70 projects from each pipe 48 parallel to the stop lug 68 and on the opposite side of the arm 62. The locking lug is shorter than the stop lug, so that the shaft 64 may be moved longitudinally a distance sufficient for the arm 62 to clear the lock lug 70 but still be supported by the stop lug (FIG. 8). In this manner the gate may be secured releasably in the extended position.

Means is provided for moving the shaft and gate between the locked and unlocked positions. In the embodiment illustrated, the cylinder 72 of an hydraulic piston-cylinder unit is mounted on the horizontal transverse rear frame member 22 with the enlarged head 74 of the piston rod 76 in alignment with the shaft 64 when the associated dual compartment 56, 58 is in the upper, 12 o-clock position (FIG. 2). Upon application of hydraulic pressure to the rear end of cylinder 72 the piston rod is moved from the retracted position illustrated in FIG. 1 to the extended position shown in FIG. 6. During this extension of the piston rod the shaft 64 is moved toward the right in FIG. 6, bringing the gate support arms 62 into locked position between the stop lug 68 and lock lug 70.

The cylinder 78 of the unlocking piston-cylinder unit is mounted on a bracket 80 (FIG. 1) on the front frame member 20 and the enlarged head 82 of its piston rod 84 is aligned with the shaft 64 when the associated dual compartment is in the lower, six o-clock position (FIG. 2). Upon application of hydraulic pressure to the forward end of the cylinder 78 the piston rod is moved from the retracted position shown in FIG. 1 to the extended position shown in FIG. 7. During this extension the piston rod 84 abuts the front end of the shaft 64 and moves the latter rearward, toward the left in FIG. 7, thereby moving the gate support arms 62 out of engagement with the lock lugs 70. Upon such disengagement, the gate and its support arms being downward by gravity into the outer compartment 58.

To insure positive transfer of bales to the inner compartment 56, a second gate 86 is associated with such gate 60. Each gate 86 is supported by arms 88 secured to a pivot shaft 90 mounted for pivotal and longitudinal movement in bearings 92 secured to the trailing pipes 48. Each of these pipes is provided with a longitudinally extending stop lug 94 (FIG. 5) arranged to intercept the arm 88 when the gate is swung outward from its retracted position within the inner compartment 56 to its extended position projecting across the space between the inner and outer compartments. This gate thus is pivotable through approximately 90° within the inner compartment, the stop lug 84 preventing swinging of the gate outward into the outer compartment 58. A locking lug 96 is associated with each stop lug 94, in the manner of lugs 68 and 70, and a pair of hydraulic piston-cylinder units 98 and 99 are associated with the opposite ends of the pivot shaft 90 for releasably locking the gate 86, in the same manner as described hereinbefore with respect to gate 60.

Figure 3:
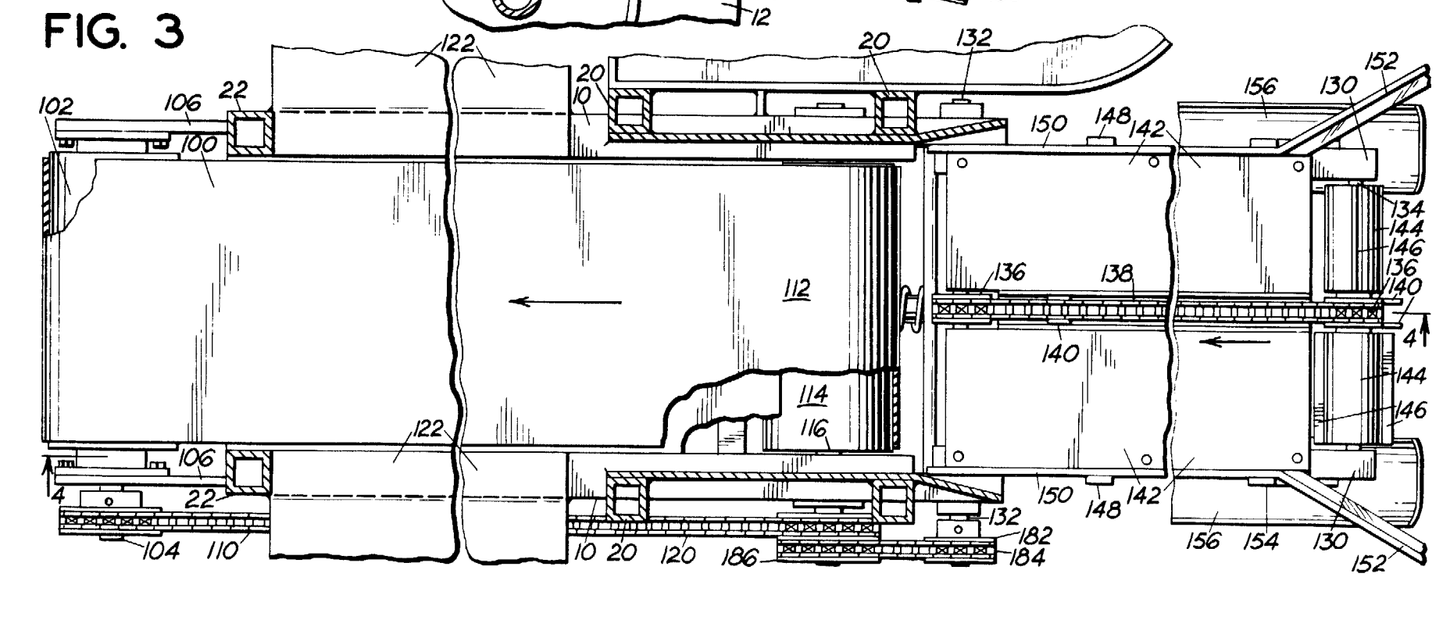
FIG. 3 is a foreshortened view in longitudinal section taken on the line 3—3 in FIG. 1.
Figure 4:
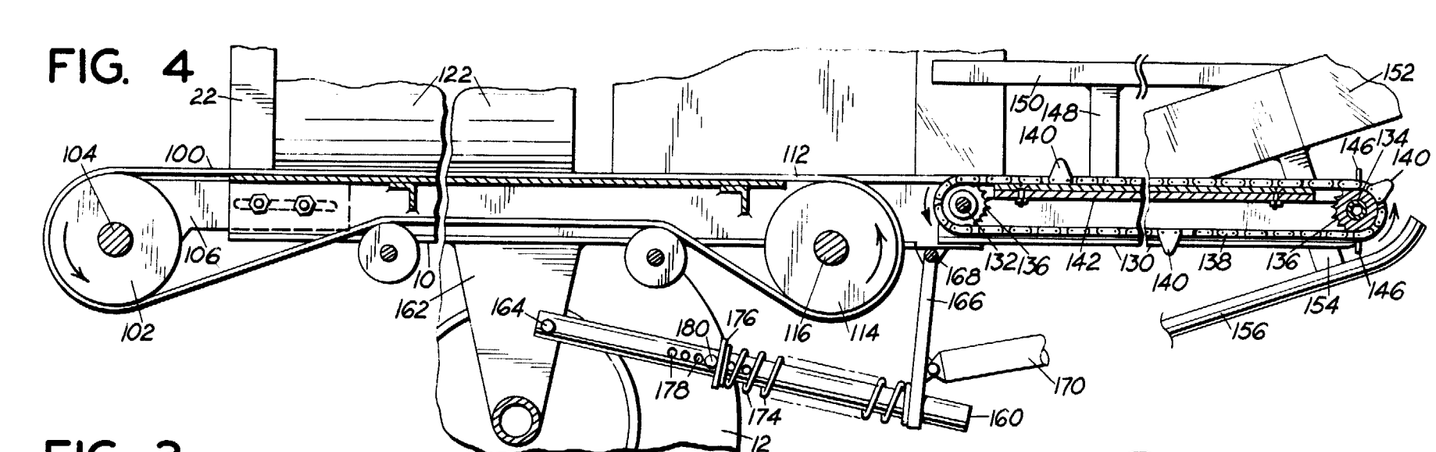
FIG. 4 is a foreshortened view in longitudinal section taken on the line 4—4 in FIG. 3.

An elongated feed conveyor is mounted on the vehicle frame 10 and extends longitudinally thereof under the rotary framework for registration with each of the peripheral compartments of the latter are rotated to the downward, six o-clock position illustrated in FIG. 2. In the embodiment illustrated, the feed conveyor includes front and rear endless belt sections (FIGS. 1, 3 and 4). The rear belt section 100 is trained about a rear roller 102 mounted on a shaft 104 supported for rotation at the rear end of the vehicle frame on longitudinally adjustable brackets 106. The front end of the rear belt section is trained about a front roller mounted for rotation with a driven, power take-off shaft 108 (FIG. 1) extending from the vehicle engine 16. The shafts 104 and 108 mount sprockets which are interconnected by an endless drive chain 110.

In similar manner, the foreward endless belt section 112 is trained about a front roller 114 mounted for rotation with a shaft 116 journaled at the front end of the vehicle frame 10 and the rearward end of the belt section is trained about a roller mounted for rotation with a driven, power take-off shaft 118 extending from the vehicle engine. These shafts 116 and 118 mount sprockets which are interconnected by an endless drive chain 120.

The power take-off shafts are coupled to the engine through reversing mechanism (not shown) whereby to enable movement of the conveyor sections simultaneously in rearward or forward direction, at the selection of the operator, to feed hay bales and like objects to or from the peripheral compartments.

Means is provided for preventing gravity removal of bales in the peripheral compartments as the latter transverse the lower half of rotation of the framwork. In the embodiment illustrated, this is provided by a pair of arcuate shield plates 122 which extend arcuately upward from opposite sides of the feed conveyor at least to a plane extending horizontally through the axis of shaft 26. The plates are supported by a framework 124 secured to the vehicle frame 10, and are positioned closely adjacent the outer ends of the pipes defining the peripheral compartments.

A delivery conveyor also is provided for picking up hay bales and like objects from the ground and delivering them to the feed conveyor. In the embodiment illustrated, a pair of laterally spaced conveyor support arms 130 are mounted pivotally at their rearward ends on a transverse shaft 132 journaled for rotation in bearings secured to the front end of the vehicle frame. The front ends of the arms also support a transverse rotary shaft 134. Each of these shafts mounts a sprocket 136 centrally of its ends and the sprockets are interconnected by an endless conveyor chain 138. A plurality of longitudinally spaced lugs 140 are mounted on the chain for movement therewith and project outwardly therefrom for engaging hay bales and like objects for moving the latter with the chain. Skid plates 142 are mounted on opposite sides of the conveyor chain 138 for supporting the objects being conveyed.

The shaft 134 at the front end of the support arms 130 also mounts a pair of laterally spaced pickup rotors 144 each provided with a plurality of radial paddles 146, to assist in picking up hay bales and like objects from the ground, as explained more fully hereinafter.

Longitudinally spaced upstanding brackets 148 on the support arms 130 mount a pair of laterally spaced guide rails 150 which extend substantially parallel to the support arms above the latter and serve to confine hay bales and like objects therebetween. Forwardly of the guide rails are a pair of laterally spaced, forwardly diverging guide arms 152 which serve to guide hay bales and like objects into the space between them and thence onto the delivery conveyor. These guide arms are supported at the upper ends of longitudinally spaced brackets 154 secured intermediate their ends to the support arms. The lower arms of these brackets support a pair of laterally spaced skid shoes 156 which are adapted to engage and slide along the ground and thus position the front end of the delivery conveyor in close proximity to the ground for picking up objects therefrom.

In the preferred embodiment illustrated, a major portion of the weight of the delivery conveyor is counterbalanced resiliently for minimizing the ground contact pressure of the skid shoes. The latter thus react quickly to variation in ground contour as the vehicle is propelled during the collection operation. This resilient support is provided in the embodiment illustrated in a rod 160 (FIG. 4) pivotally secured at its rearward end to a vehicle frame bracket 162, as by a pivot pin 164. The opposite end of the rod extends slidably through an opening in a hinge plate 166 secured pivotally to the vehicle frame by a pivot shaft 168. A link member 170 pivotally interconnects the hinge plate and a bracket 172 (FIG. 1) projecting downward from the support arms 130 of the delivery conveyor. A coil spring 174 encircles the rod and abuts at one end against the hinge plate and at the opposite end against a collar 176 mounted slidably on the rod. A plurality of longitudinally spaced, transverse openings 178 in the rod removably receive an abutment pin 180 for the collar. Accordingly, the collar may be adjusted along the length of the rod and secured in adjusted position by the abutment pin, to vary the compression of the coil spring and hence the resilient counterbalancing support of the delivery conveyor.

In the preferred embodiment illustrated, the link member 170 is provided in the form of an extensible and retractable fluid pressure piston-cylinder unit. Thus, by the application of fluid pressure to effect extension of the latter from the retracted position illustrated in FIG. 1, the delivery conveyor is pivoted upwardly about the axis of the shaft 132 to any desired degree of inclination, such as is exemplified by the broken lines in FIG. 1. In this position the delivery conveyor may be aligned with a storage conveyor leading form a barn or other storage facility, to transfer the hay bales or like objects from the collection framework to the storage facility.

The delivery conveyor chain 138 is conveniently driven from the same source of power as the feed conveyor. Thus, a sprocket 182 is mounted on the rearward shaft 132 and is coupled through a drive chain 184 to a second sprocket 186 mounted on the shaft 116 supported the front end of the front feed conveyor section 112.

The operation of the apparatus described hereinbefore is as follows: Let it be assumed that the collection compartments of the framework are empty and it is desired to collect hay bales B from the field for transport to storage. Let it also be assumed that the trailing gates 86 are locked in closed position. The operator of the vehicle lowers the front end of the delivery conveyor to bring the skid shoes 156 into resilient contact with the ground, and adjusts the reversing mechanism of the power take-off of the engine 16 to effect movement of the upper working stretches of the feed conveyor 100, 112 and delivery conveyor 138 toward the rear of the vehicle. The operator also activates the framework drive motor 40 to rotate the framework until one of the peripheral compartments, preferably the outer compartment 58 of a dual compartment, is aligned with the feed conveyor. The operator then moves the vehicle through the field to pick up hay bales onto the delivery 138 from whence they are delivered rearwardly to the feed conveyor. The bales are moved sequentially toward the rear of the compartment where the rearwardmost bale abuts the stop plate 190 (FIG. 5) which traverses the rearward end of the compartment. The feed conveyor continues to rotate, sliding under the stopped bales supported thereon.

Typically, the longitudinal length of the framework compartments is about 20 feet. Accordingly, each compartment may contain from 5 to 7 bales, depending upon the size thereof. Thus, assuming 6 bales may be contained in each compartment, the total of 16 compartments in the embodiment illustrated (FIG. 2) serve to collect a total of 96 bales.

When the first compartment has been filled with bales $B_1$ (FIG. 10), the operator again energizes the framework drive motor 40 to rotate the framework until the next adjacent peripheral compartment 54 registers with the feed conveyor 112. During this rotation the bales $B_1$ collected in the first compartment are moved arcuately off at the feed conveyor and onto the inner surface of the arcuate shield 122, the latter serving to retain the bales in the compartment.

The foregoing sequence is repeated until the first six peripheral compartments are filled with bales. When the compartment containing the first group of bales $B_1$ reaches the upper position of its rotation (FIG. 1), the unlocking cylinder 98 is extended to release the gate 86. The latter thereupon swings downward into the inner compartment, whereupon the bales $B_1$ drop into the inner compartment. The leading gate 60 then swings downward behind the bales to the extended position traversing the space between the inner and outer compartments. The operator then actuates cylinder 72 to extend its piston rod and moves the pivot shaft 64 forward and lock the gate arms between the stop lug 68 and the lock lug 70. The leading gate thus is locked in the extended position.

Figure 13:
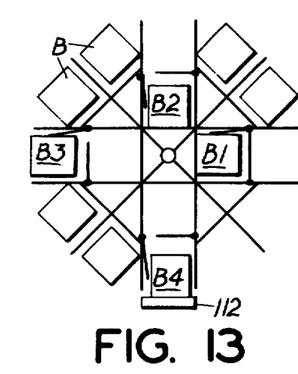

The framework construction illustrated provides the dual inner and outer compartments 56 and 58 at 90° intervals around the framework. Accordingly, the foregoing sequence of operations, by which the groups of bales $B_2$, $B_3$ and $B_4$ are transferred from the outer peripheral compartments 58 to the associated inner compartments 56, is repeated at 90° intervals of rotation of the framework (FIGS. 13, 14 and 15) as will be understood.

Figure 10:
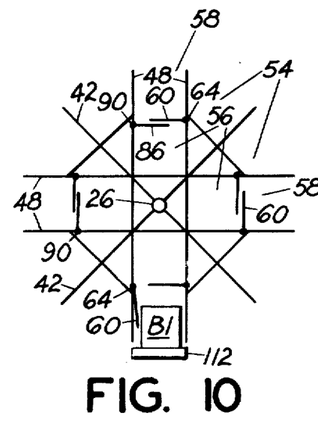
FIGS. 10–17 are schematic front elevational views illustrating the sequence of operations in loading bales into the apparatus.
Figure 11:
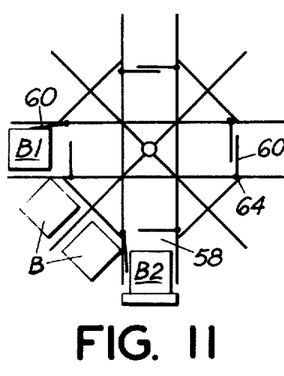
Figure 12:
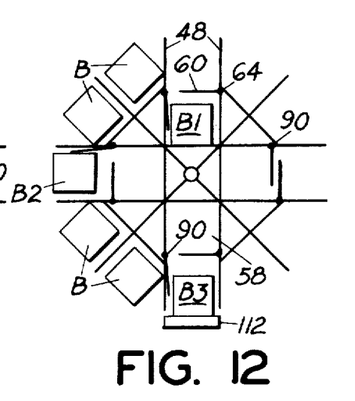
Figure 14:
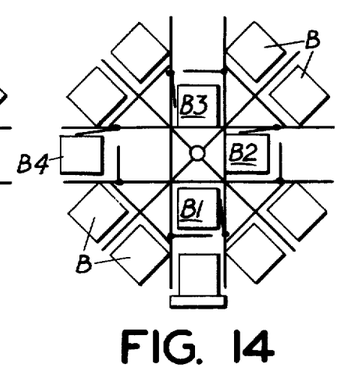
Figure 15:
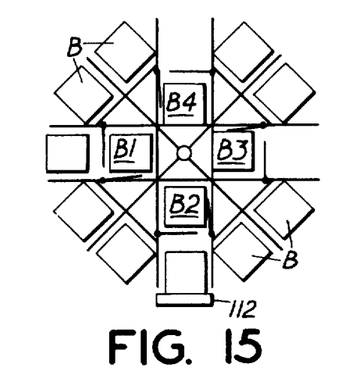
Figure 16:
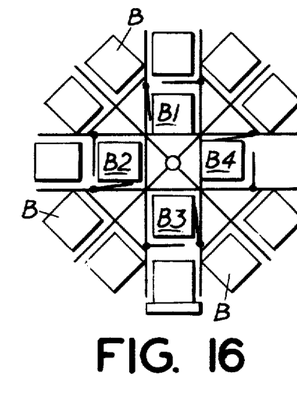
Figure 17:
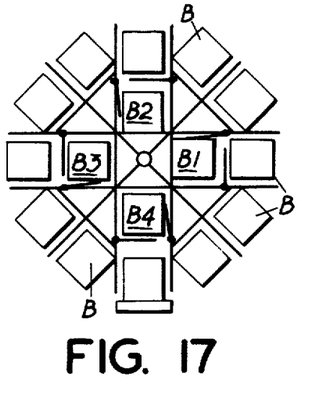

FIGS. 2 and 14 illustrate the condition when the framework has rotated 360° from the start position of FIG. 10. The dual compartment in which the first group of bales $B_1$ were inserted and subsequently transferred to the inner compartment thereof, now is once again in registry with the feed conveyor 112. The associated peripheral compartment 58 then is filled with bales, as indicated. The framework then is rotated sequentially through additional 90° intervals (FIGS. 15, 16 and 17) to complete the filling of the outer peripheral compartments of the corresponding dual compartments. With the framework thus fully loaded, the vehicle then may be driven to the storage facility for transfer of the bales to storage.

At the storage site, the operator directs fluid under pressure to the cylinder 170 of the piston-cylinder unit to elevate the delivery conveyor arcuately upward (broken lines in FIG. 1) for alignment with the infeed end of a storage conveyor (not shown) which extends into the storage facility. With the collection framework in the position illustrated in FIG. 17, the operator then reverses the drive of the feed conveyor 100, 112 and delivery conveyor 138 to effect movement of their upper working stretches toward the front of the vehicle. The group of bales contained in the peripheral compartment 58 registering with the feed conveyor thus is moved out of the compartment, along the delivery conveyor and thence to the storage conveyor for entrance into the storage facility.

Figure 7:
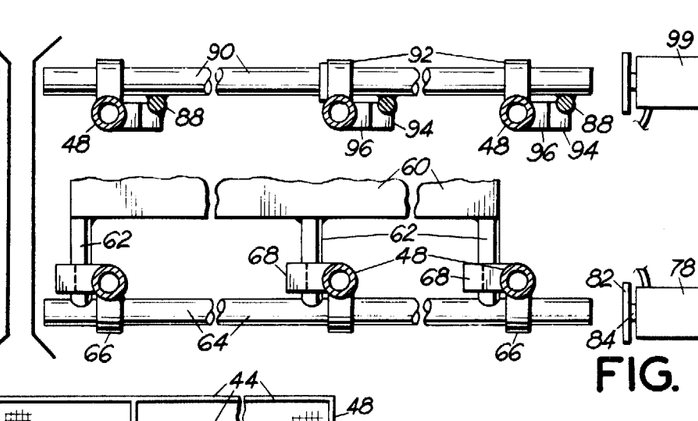
FIG. 7 is a foreshortened view in longitudinal section taken on the line 7—7 in FIG. 1.

Having thus removed the group of bales from the outer compartment, the operator activates the unlocking cylinder 78 to extend its piston rod and move the gate pivot shaft 64 rearward (FIG. 7). The gate support arms 62 thus are removed from the locking lugs 70, whereupon the gate 60 swings arcuately downward into the peripheral compartment 58, releasing the group of bales $B_4$ to drop from the inner compartment 56 onto the feed conveyor (FIG. 18) for removal to storage.

Figure 18:
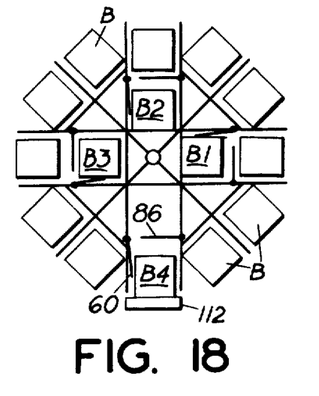
FIG. 18 is a schematic front elevational view illustrating the first stage of unloading bales from the apparatus.

Upon removal of the bales $B_4$ from the inner compartment, the trailing gate 86 swings downward to closed position (FIG. 18). The locking cylinder 99 then is activated to extend its piston rod (FIG. 7) and move the pivot shaft 90 and gate arms 88 rearward into locked position between the stop lugs 94 and lock lugs 96. The gate 86 thus is locked closed, as in FIG. 10.

The operator then indexes the framework to bring the next adjacent peripheral compartment 54 into registry with the feed conveyor, for removal of the bales. This sequence is repeated until all of the compartments have been emptied of their contents of bales. The framework thus is returned to the condition of FIG. 10, in readiness to repeat the collecting cycle.

Although the provision of the reversible delivery conveyor 138 is preferred, it will be apparent that outfeed of bales from the framework compartments may be effected from the rear end of the vehicle, by removal of the rear abutment plates 190 and alignment of the feed conveyor 100 with a storage conveyor. In this event, the feed and delivery conveyors need not be reversible, and the piston-cylinder unit 170 need function merely to elevate the forward end of the delivery conveyor above the ground to facilitate transport of the vehicle between the field and storage facility.

From the foregoing it will be appreciated that the apparatus of this invention provides for the collection and unloading of hay bales and like objects of diverse shapes and sizes with maximum speed and facility and by a single operator. The compartment forming framework accommodates the collection of a maximum number of objects in relation to its size and weight, thereby affording maximum efficiency and economy of operation.

It will be apparent to those skilled in the art that various changes may be made in the size, shape, and type, number and arrangement of parts described hereinbefore without departing from the spirit of this invention.

Having now described our invention and the manner in which it may be used, we claim:

1. Apparatus for collecting and unloading hay bales and like objects, comprising:
   a. a mobile vehicle frame,
   b. an elongated framework mounted longitudinally on the vehicle frame for rotation on a horizontal axis,
   c. the framework defining a plurality of longitudinally extending, circumferentially spaced peripheral compartments and a plurality of longitudinally extending, circumferentially spaced inner compartments each registering with a peripheral compartment,
   d. gate means on the framework associated with each inner compartment and movable between an extended position operatively closing the inner compartment from the associated peripheral compartment, for retaining objects removably in the inner compartment, and a retracted position opening said inner compartment to the associated peripheral compartment, for passage of objects between said compartments,
   e. feed conveyor means on the vehicle frame extending longitudinally of and below the rotary framework for registration with each peripheral compartment selectively upon rotation of the framework,
   f. framework drive means interengaging the vehicle frame and framework for rotating the latter stepwise to register each peripheral compartment selectively with the feed conveyor means,
   g. feed conveyor drive means interengaging the vehicle frame and feed conveyor for moving the latter,
   h. shield means on the vehicle frame extending arcuately upward from opposite sides of the feed conveyor for enclosing at least the lower half of the framework.

2. The apparatus of claim 1 including lock means on the framework operable to engage the gate means releasably to secure the latter in said extended position.

3. The apparatus of claim 2 wherein the gate means comprises an elongated gate member mounted on the framework for pivotal movement between said extended and retracted positions and for longitudinal movement, and the lock means comprises locking lug means on the framework arranged upon longitudinal movement of the gate member to releasably engage and lock the latter in said extended position.

4. The apparatus of claim 1 including delivery conveyor means mounted on theh vehicle frame forwardly of and in alignment with the feed conveyor for picking up objects and deliverying them to the feed conveyor means, and delivery conveyor drive means for moving the delivery conveyor.

5. The apparatus of claim 4 wherein the feed conveyor and delivery conveyor are connected together for simultaneous movement and the feed conveyor drive means is reversible for moving the conveyors selectively in reverse directions, for the collection and unloading of objects into and frame the framework compartments.

6. The apparatus of claim 4 including pivot means mounting the delivery conveyor means on the vehicle frame for movement of the forward end thereof between a lowered position adjacent the ground for receiving objects thereon and an elevated position above the ground, and power means interengaging the vehicle frame and delivery conveyor means for moving the latter between said lowered and elevated positions.

7. The apparatus of claim 6 wherein the power means includes means counterbalancing a major portion of the weight of the delivery conveyor means for reducing the ground-engaging pressure of the latter when in said lowered position.

8. The apparatus of claim 1 including
   a. lock means on the framework operable to engage the gate means releasably to secure the latter in said extended position,
   b. delivery conveyor means mounted on the vehicle frame forwardly of and in alignment with the feed conveyor and movable for picking up objects and delivering them to the feed conveyor means,
   c. the feed conveyor and delivery conveyor being connected together for simultaneous movement and the feed conveyor drive means being reversible for moving the conveyors selectively in reverse directions, for the collection and unloading of objects into and from the framework compartments,
   d. pivot means mounting the delivery conveyor means on the vehicle frame for movement of the forward end thereof between a lowered position adjacent for receiving objects thereon and an elevated position above the ground, and
   e. power means interengaging the vehicle frame and delivery conveyor means for moving the latter between said lowered and elevated positions,
   f. the power means including means counterbalancing a major portion of the weight of the delivery conveyor means for reducing the ground-engaging pressure of the latter when in said lowered position.

9. Apparatus for collecting and unloading hay bales and like objects, comprising
   a. a mobile vehicle frame,
   b. an elongated framework mounted longitudinally on the vehicle frame for rotation on a horizontal axis,
   c. the framework defining a plurality of longitudinally extending, circumferentially spaced peripheral compartments,
   d. feed conveyor means on the vehicle frame extending longitudinally of and below the rotary framework for registration with each peripheral compartment selectively upon rotation of the framework,
   e. framework drive means interengaging the vehicle frame and framework for rotating the latter stepwise to register each peripheral compartment selectively with the feed conveyor means,
   f. feed conveyor drive means interengaging the vehicle frame and feed conveyor for moving the latter selectively in forward and reverse directions,
   g. shield means on the vehicle frame extending arcuately upward from opposite sides of the feed conveyor for enclosing at least the lower half of the framework,
   h. delivery conveyor means mounted on the vehicle frame forwardly of and in alignment with the feed conveyor and movable for picking up objects and delivering them to the feed conveyor means,
   i. delivery conveyor drive means for moving the delivery conveyor selectively in forward and reverse directions,
   j. pivot means mounting the delivery conveyor means on the vehicle frame for movement on the forward end thereof between a lowered position adjacent the ground for receiving objects thereon and an elevated position above the ground, and
   k. power means interengaging the vehicle frame and delivery conveyor means for moving the latter between said lowered and elevated positions,
   l. the power means including means counterbalancing a major portion of the weights of the delivery conveyor means for reducing the ground-engaging pressure of the latter when in said lowered position.

* * * * *